No. 685,810. Patented Nov. 5, 1901.
E. C. WORNS.
CARBONATING APPARATUS.
(Application filed Nov. 22, 1899.)

(No Model.)

WITNESSES:
Edward Thorpe
Isaac B. Owens

INVENTOR
Edwin C. Worns
BY
ATTORNEYS

UNITED STATES PATENT OFFICE.

EDWIN CHARLES WORNS, OF NEW YORK, N. Y.

CARBONATING APPARATUS.

SPECIFICATION forming part of Letters Patent No. 685,810, dated November 5, 1901.

Application filed November 22, 1899. Serial No. 737,939. (No model.)

*To all whom it may concern:*

Be it known that I, EDWIN CHARLES WORNS, a citizen of the United States, and a resident of the city of New York, borough of Manhattan, in the county and State of New York, have invented a new and Improved Carbonating Apparatus, of which the following is a full, clear, and exact description.

This invention relates to an apparatus for carbonating or aerating water in which a container is provided for the water, and in this container is situated a chamber or chambers through which the water and gas are successively passed, the chamber or chambers containing pebbles or other finely-divided substance for facilitating the aeration of the water.

This specification is the disclosure of one form of my invention, while the claim defines the actual scope thereof.

Reference is to be had to the accompanying drawings, forming a part of this specification, in which similar characters of reference indicate corresponding parts in both views.

Figure 1:
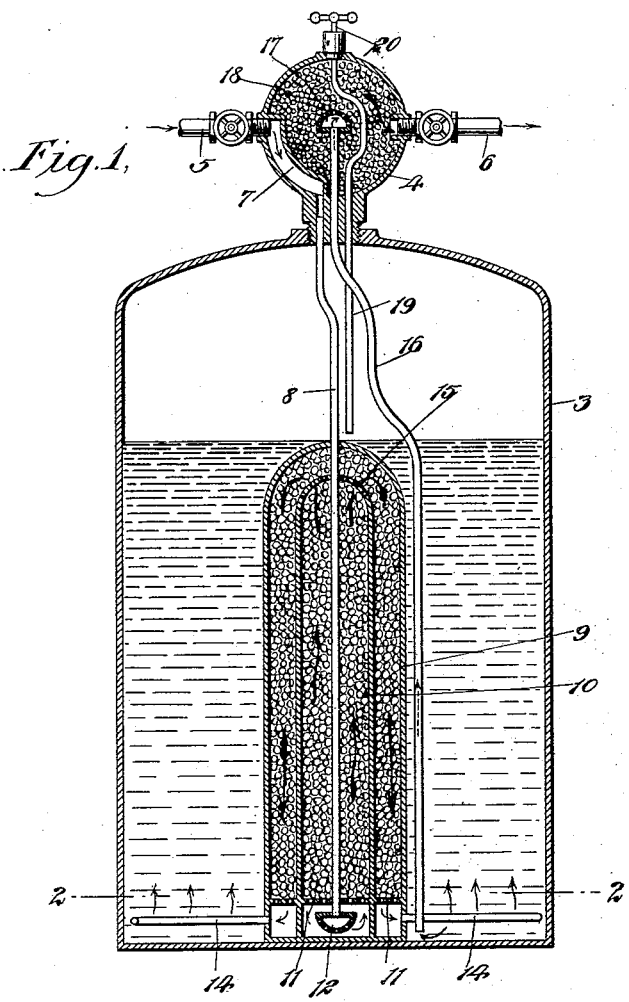
Figure 2:
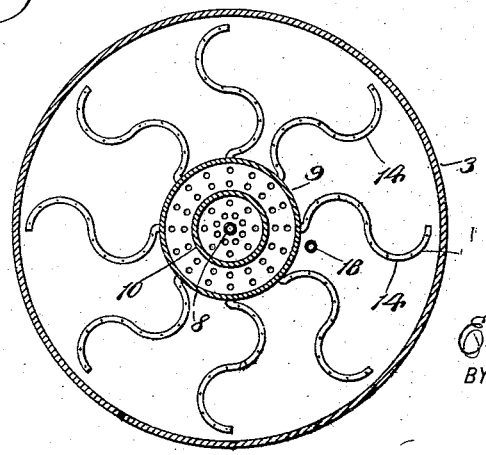

Figure 1 is a vertical section taken through the apparatus, and Fig. 2 is a horizontal section on the line 2 2 of Fig. 1.

The main container or reservoir 3 has a globular head 4 screwed therein. This head has a valve-controlled inlet-pipe 5 leading into one side and a valve-controlled outlet-pipe 6 leading from the other side. The pipe 5 communicates with a subchamber or passage 7 in the head 4, and this passage in turn communicates with the tube 8, which passes downward through a cylindrical chamber 9, mounted in the container 3. This chamber 9 is divided into a sub or inner chamber by means of a cylindrical wall 10, and the two chambers are provided with perforate walls 11 at their lower portions, below which walls the tube 8 is passed, the tube discharging through a perforated nozzle 12, situated in the inner or sub chamber formed by the wall 10. The outer chamber, formed by the wall 9, is provided at its lower portion below the partition 11 with a number of curved spray-pipes 14, which pass into the container 3 at the bottom thereof. The course of the water and gases in passing down through the pipe 8 continues from the recess 12, where the water and gases pass up through the inner chamber, formed by the wall 10, and out through perforations 15 in the top thereof into the outer chamber, formed by the wall 9. The water and gases thence pass down through this outer chamber, below the perforated partition 11, and out into the container by the pipes 14. The chambers formed by the walls 9 and 10 are filled with gravel or other similar material, as shown in the drawings. The carbonated or aerated water is forced up from the bottom of the container 3 through a pipe 16, which passes into the center of the head 4 and is provided with a perforated nozzle 17, discharging the water into the head 4, which is filled with pebbles or other like material 18, as shown. From here the water passes out by the pipe 6. An overflow-pipe 19 is provided, the pipe passing from the upper portion of the container 3 upward through the head 4, where it is controlled by a valve 20.

In using the apparatus the water to be aerated is introduced into the container by way of the pipe 5, the water passing down through the pipe 8, through the chamber formed by the walls 9 and 10, and into the container. When a sufficient volume of water has been introduced, the supply of water is cut off and the gas is introduced through the same pipe—that is to say, the pipe 5. The gas passes along the same route as that taken by the water, and thus effects the aeration thereof. The pressure of the gas in the top of the tank permits the aerated or carbonized water to be withdrawn whenever the pipe 6 is opened.

Having thus described my invention, I claim as new and desire to secure by Letters Patent—

A carbonating apparatus, comprising a container, a head mounted on said container and having an inlet-passage separate from its main interior which is adapted to be filled with granular material, an inlet-pipe attached to said head and opening into said passage, an outlet-pipe attached to said head and leading from the main interior thereof, and a pipe leading from the container to the head and having a perforated nozzle discharging into the granular material, as set forth.

EDWIN CHARLES WORNS.

Witnesses:
EMIL ARTHUR BACHMANN,
OLIVER BRYAN.